United States Patent [19]
Zelez

[11] Patent Number: 5,098,618
[45] Date of Patent: Mar. 24, 1992

[54] SURFACE MODIFICATION OF PLASTIC SUBSTRATES

[76] Inventor: Joseph Zelez, R.D. #1, Box 473E, Henryville, Pa. 18332

[21] Appl. No.: 493,274

[22] Filed: Mar. 14, 1990

[51] Int. Cl.$^5$ ............................................. B29C 35/08
[52] U.S. Cl. ...................... 264/22; 264/1.4; 264/83; 425/174.4
[58] Field of Search .............. 264/22, 83, 1.4; 425/174.4, 174

[56] References Cited

U.S. PATENT DOCUMENTS

| | | | |
|---|---|---|---|
| 4,315,808 | 2/1982 | Imada et al. | 264/83 |
| 4,317,788 | 3/1982 | Imada et al. | 264/83 |
| 4,879,073 | 11/1989 | Kromrey | 425/174 |
| 4,933,123 | 6/1990 | Yoshida et al. | 264/22 |

FOREIGN PATENT DOCUMENTS

| | | | |
|---|---|---|---|
| 61-200133 | 9/1986 | Japan | 264/22 |
| 62-50336 | 3/1987 | Japan | 264/22 |
| 62-79236 | 4/1987 | Japan | 264/83 |

*Primary Examiner*—Jeffery Thurlow
*Attorney, Agent, or Firm*—Frank J. Benasutti

[57] ABSTRACT

The present invention is a process for treating plastic substrates to improve their surface properties. The process involves exposing the plastic substrate to UV radiation at wavelengths of 185 and 254 nm in the presence of atomic oxygen for about 5 to 60 minutes. The treated plastic substrates have improved wettability. The process is particularly well suited for the treatment of plastic intraocular lenses and plastic packaging materials such as PVC film.

7 Claims, No Drawings

SURFACE MODIFICATION OF PLASTIC SUBSTRATES

FIELD OF THE INVENTION

The present invention relates to a process for treating plastic substrates and the product produced thereby. More particularly, this invention relates to a process for altering the surface properties substrates by selectively exposing the same to electromagnetic radiation in the presence of selected gases.

BACKGROUND OF THE INVENTION

A variety of processes have been proposed for the surface treatment of plastic substrates. These include, for example, corona treatment, cold gas plasma surface treatment, and other chemical treatments. Several U.S. patents illustrate known surface treatment processes.

U.S. Pat. No. 4,046,706, issued to Krezanoski, discloses cleaning a contact lens in a cleaning solution comprising specific surfactants to reduce the contact angle of the lens surface.

U.S. Pat. No. 4,063,890, issued to Barron, discloses asceptization of a contact lens by exposing the contact lens enveloped in a saline solution to UV radiation having wavelengths longer than 221 nm in the substantially complete absence of ozone.

U.S. Pat. No. 4,104,187, issued to Sibley et al. discloses, discloses disinfecting soft contact lenses at an elevated temperature in an aqueous saline solution containing specific surfactants.

U.S. Pat. No. 4,214,014, issued to Hofer et discloses, discloses a surface treatment for hard or dehydrated hydrophilic contact lenses in an oxygen gas plasma at low pressures, preferably equal to or less than 10 mm Hg.

U.S. Pat. No. 4,229,273, issued to Wajs, discloses grafting an unsaturated monomer to a silicon resin contact lens by irradiating the molded silicon resin contact lens with non-ionizing UV radiation having a wavelength within the range of 1800 to 4000 Angstroms and a power intensity of 100 to 1000 mWatts/cm$^2$ for 5 seconds to 30 minutes in the presence of oxygen and subsequently contacting the contact lens with a specific monomer.

U.S. Pat. No. 4,552,626, issued to Stevenson, discloses the cleaning of plastic substrates with an alkaline cleaning solution and deglazing resin from the surface with an acid or organic solvent prior to electroplating the plastic substrate.

SUMMARY OF THE INVENTION

The present invention is a process for treating plastic substrates to improve their surface properties. The process involves exposing the plastic substrate to UV radiation at wavelengths of 185 and 254 nm in the presence of atomic oxygen for about 5 to 60 minutes. The treated plastic substrates have improved wettability. The process is particularly well suited for the treatment of plastic intraocular lenses and plastic packaging material such as PVC film.

The present invention comprises a process for treating a plastic substrate, said process comprising providing a plastic substrate; and exposing said plastic substrate to electromagnetic radiation from a source emitting radiation in the UV region at wavelengths of about 185 nm and about 254 nm at an energy of from about 10 to about 15 mWatts/cm$^2$ for a period of time between about 5 and 120 minutes at a distance of not more than about 1.25 cm from said source in the presence of oxygen and in the substantial absence of any other gas.

An advantage of the process of the present invention is that the process increases the hydrophilic properties of the substrate surface. Thusly treated substrates have improved wettability.

DETAILED DESCRIPTION OF THE INVENTION

According to the present invention, plastic substrates are exposed to electromagnetic radiation in UV region, preferably at about 185 and 254 nm wavelengths, from a low pressure quartz-mercury vapor lamp in the presence of oxygen. Under these conditions, ozone and atomic oxygen are generated. It is believed that the atomic oxygen reacts with the plastic surface to modify it to a depth of approximately 100 Angstroms forming oxide and/or hydroxide sites, thus reducing the hydrophobicity of the surface.

The source of the UV radiation is preferably a low pressure quartz-mercury vapor lamp emitting at an intensity of from about 10 to about 15 mWatts/cm$^2$ Preferably, the plastic substrate is positioned at a distance of not more than 1.25 cm from the source, more preferably a distance of not more than about 1 cm, and most preferably not more than about 0.75 cm. The plastic substrate is exposed for a period of time of from about 5 to about 120 minutes, preferably of from about 5 to about 60 minutes.

While an environment of pure oxygen is preferred, the oxygen may be doped with other gases such as argon, carbon dioxide, nitrogen or mixtures thereof for economic or safety considerations. Environments of ultra high purity gases are preferred. It is understood however, that only quantities and mixtures of such additional gases are used which do not substantially inhibit the operability and advantages of the process. If additional gases are used, the ratio of oxygen to the additional gas is preferably within the range of from about 1:3 to about 3:1, more preferably from about 1:2 to about 2:1.

Suitable substrates which may be treated according to the process of the present invention are substrates comprising plastics such as polyethylene, polypropylene, polystyrene, polymethylmethacrylate (PMMA), silicone-elastomers, polyurethenes, polyamides, polyimides, PET, PVC, PVDC, polyethers, other acrylates, ABS or the like.

The present process is useful for the treatment of plastic substrates such as catheters, writing tubes, intraocular lenses, packaging materials and the like to improve the hydrophilic wettability of the surfaces thereof. Substrate surfaces having low contact angles, which is a function of the hydrophilic properties, may be obtained. Contact angles of less then 10 degrees, preferably 4 to 5 degrees are achievable. The contact angle of the treated substrate may be measured using methods known in the art such as steam nucleation.

The following examples are illustrative of the invention. However, it is understood that the examples are not intended to limit the scope of the invention.

I. Substrate Cleaning

The plastic substrate is generally cleaned to remove surface contaminates. Cleaning techniques known in the art may be used such as scrubbing, ultrasoneration and the like. An acceptable cleaning procedure comprises soaking the plastic substrate in an alcohol such as Everclear 190 proof grain alcohol for about 15 minutes, rinsing the substrate in distilled water, soaking the substrate in the alcohol in a microwave oven at about 250 Watt power, again rinsing the substrate with distilled water, and finally drying the substrate in a clean environment.

II. Exposure of Substrate

The cleaned substrate is then placed in an ultra-violet ozone cleaning system (UVOCS ™) available from UVOCS, inc. of Montgomeryville, Pa. which has been purged with high purity oxygen. The substrate is then exposed within the UVOCS to UV radiation from a quartz-mercury vapor lamp at a distance of not more than 1.25 cm for 5 to 120 minutes. The flow of oxygen may be terminated once the exposure has begun. Alternatively, oxygen flow may be provided intermittently during exposure.

Table I illustrates the results obtained by exposing a cleaned PMMA substrate in a UVOCS ™ T0606B under the conditions specified therein. In Table I, "s" denotes the separation distance between the substrate and the quartz-mercury vapor lamp in centimeters, "t" denoted time of exposure in minutes, and "g" denotes the gas or gas mixture environment during exposure. Where the gas is indicated as other than air, ultra-high purity gases in a laminar flow hood housing are used.

TABLE 1

| s | t | g | Results of Steam Test |
|---|---|---|---|
| 1.25 | 10 | air | Water breaks |
| 1.25 | 15 | air | Small water droplets |
| 1.25 | 20 | air | Small water droplets |
| 1.25 | 45 | air | Small water droplets |
| 1.25 | 60 | air | Small water droplets |
| 0.6 | 10 | air | Water breaks |
| 0.6 | 15 | air | Small water droplets |
| 0.6 | 20 | air | Orange peel, contact angle <10° |
| 0.6 | 45 | air | Orange peel, contact angle <10° |
| 0.6 | 60 | air | Orange peel to multicolor fringes, contact angle 4–10° |
| 0.6 | 10 | $O_2$ | Water breaks |
| 0.6 | 15 | $O_2$ | Orange peel, contact angle <10° |
| 0.6 | 20 | $O_2$ | Multicolor fringes, contact angle <4° |

TABLE 1-continued

| s | t | g | Results of Steam Test |
|---|---|---|---|
| 0.6 | 45 | $O_2$ | Multicolor fringes, contact angle <4° |
| 0.6 | 60 | $O_2$ | Multicolor fringes, contact angle <4° |
| 0.6 | 10 | Ar:$O_2$ at 1:1 | Water breaks |
| 0.6 | 15 | Ar:$O_2$ at 1:1 | Orange peel, contact angle <10° |
| 0.6 | 20 | Ar:$O_2$ at 1:1 | Multicolor fringes, contact angle <4° |
| 0.6 | 45 | Ar:$O_2$ at 1:1 | Multicolor fringes, contact angle <4° |
| 0.6 | 60 | Ar:$O_2$ at 1:1 | Multicolor fringes, contact angle <4° |

What is claimed is:

1. A process for treating a plastic substrate to increase its hydrophilic wettability and reduce its hydrophobicity, said process comprising:
   (a) providing a plastic substrate; and
   (b) exposing said plastic substrate to electromagnetic radiation from a source emitting radiation in the UV region at wavelengths of about 185 nm and about 254 nm at an energy of from about 10 to about 15 mWatts/cm² for a period of time between about 5 and 120 minutes at a distance of not more than about 0.75 cm from said source in the presence of oxygen and in the substantial absence of any other gas to thereby increase its hydrophilic wettability and reduce its hydrophobicity.

2. A process according to claim 1, wherein in addition to said oxygen a gas selected from the group consisting of argon, carbon dioxide, nitrogen and mixtures thereof is present during said exposure to radiation.

3. A process according to claim 2, wherein said additional gas is present during said exposure to radiation in a ratio of oxygen to said additional gas of from about 1:3 to about 3:1.

4. A process according to claim 3, wherein argon is present during said exposure to radiation in a ratio of oxygen to argon of from about 1:2 to about 2:1.

5. A process according to claim 1, wherein said source is a low pressure quartz mercury vapor lamp.

6. A process according to claim 1, wherein said period of time is between about 5 and about 60 minutes.

7. A process according to claim 1, wherein said plastic substrate comprises a plastic selected from the group consisting of polyethylene, polypropylene, polystyrene, polymethylmethacrylate (PMMA), silicone-elastomers, polyurethenes, polyamides, polyimides, PET, PVC, PVDC, a polyether, an acrylate and ABS.

* * * * *